(12) United States Patent
Sasaki et al.

(10) Patent No.: US 8,349,118 B2
(45) Date of Patent: Jan. 8, 2013

(54) MANUFACTURING METHOD AND MANUFACTURING APPARATUS FOR A NON-CONTACT COMMUNICATION MEDIUM

(75) Inventors: Shintarou Sasaki, Miyagi (JP); Takanori Aizawa, Miyagi (JP); Yuji Sakai, Saitama (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 12/968,965

(22) Filed: Dec. 15, 2010

(65) Prior Publication Data

US 2011/0146878 A1 Jun. 23, 2011

(30) Foreign Application Priority Data

Dec. 22, 2009 (JP) ................. P2009-291217

(51) Int. Cl.
*B32B 37/06* (2006.01)
(52) U.S. Cl. ............... 156/272.2; 428/207; 438/118
(58) Field of Classification Search ............... 156/272.2; 438/118; 432/128, 207
See application file for complete search history.

(56) References Cited

U.S. PATENT DOCUMENTS

| 3,265,547 A * | 8/1966 | Selbe ................. 156/85 |
| 6,900,767 B2 * | 5/2005 | Hattori ............... 343/702 |
| 2008/0173997 A1 * | 7/2008 | Kobayashi ........... 257/679 |

FOREIGN PATENT DOCUMENTS

| JP | 2005141567 A | * | 6/2005 |
| JP | 2007-272748 | | 10/2007 |

OTHER PUBLICATIONS http://www.merriam-webster.com/dictionary/partitioning, accessed Apr. 23, 2012.*

* cited by examiner

*Primary Examiner* — Richard Crispino
*Assistant Examiner* — Elizabeth Royston
(74) *Attorney, Agent, or Firm* — K&L Gates LLP

(57) ABSTRACT

Provided is a manufacturing method for a non-contact communication medium, including: forming in a first region a first structure including an IC chip mounted on the first region, a first adhesive in an uncured state, which is applied on the IC chip, and a first plate member placed on the first adhesive; forming in a second region a second structure including a second adhesive in an uncured state, which is applied on the second region, and a second plate member placed on the second adhesive; sandwiching the first region and the second region by a first partition wall capable of partitioning the first region and accommodating the first structure and a second partition wall capable of partitioning the second region and accommodating the second structure; and heating the first partition wall and the second partition wall, to thereby thermally cure the first adhesive and the second adhesive, respectively.

8 Claims, 9 Drawing Sheets

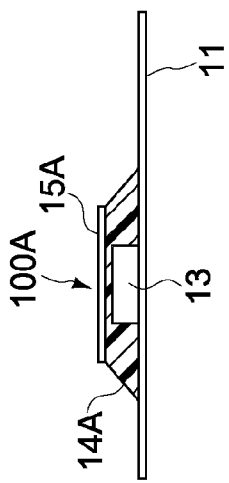
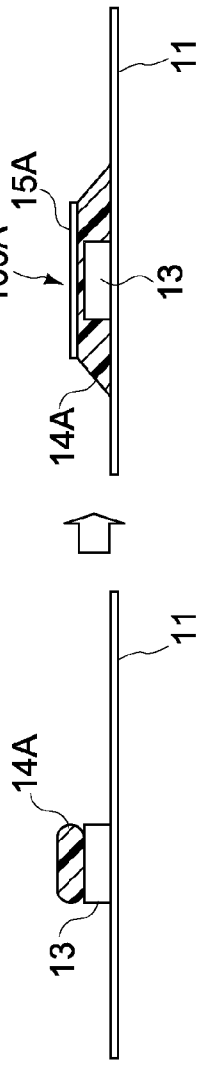
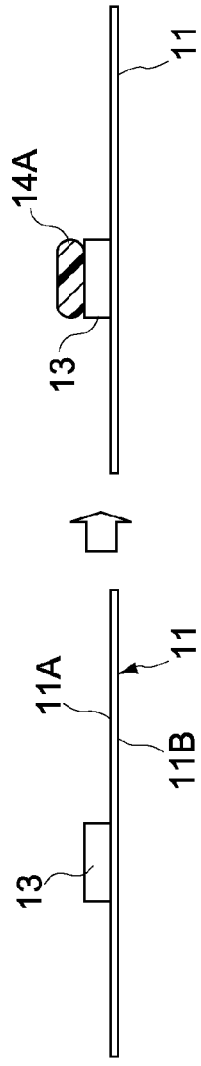
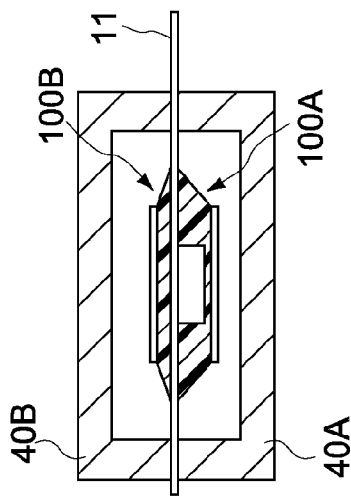
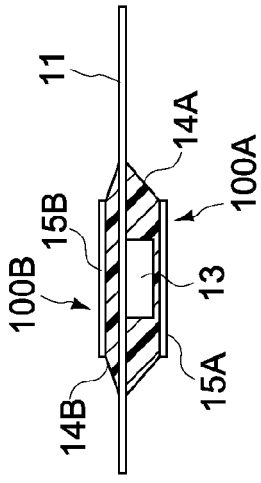
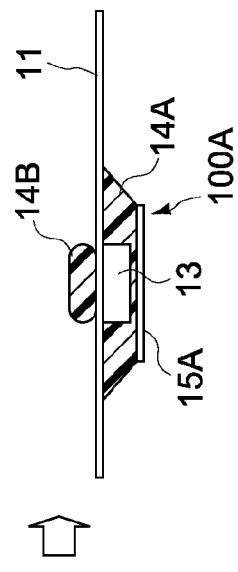

MANUFACTURING METHOD AND MANUFACTURING APPARATUS FOR A NON-CONTACT COMMUNICATION MEDIUM

CROSS REFERENCES TO RELATED APPLICATIONS

The present application claims priority to Japanese Priority Patent Application JP 2009-291217 filed in the Japan Patent Office on Dec. 22, 2009, the entire content of which is hereby incorporated by reference.

BACKGROUND

The present application relates to a manufacturing method and a manufacturing apparatus for a non-contact communication medium including an antenna pattern for non-contact communication and an IC chip.

SUMMARY

In recent years, non-contact communication media typified by non-contact IC cards have been used in various fields. For example, the non-contact communication media have been used as prepaid cards, in a security system, or for electronic payment, while mainly used in applications relating to the transportation, for example, in the entrance gate of the rail way. The non-contact IC card of this type includes an IC module. The IC module includes the following: a base plate made of a resin, in which an antenna pattern is formed for non-contact communication; and an IC chip mounted on the base plate. The IC module is sandwiched between a pair of outer sheets, to thereby be formed into a card. There is a demand of increasing the strength of a mounting region of the IC chip in the non-contact IC cards in view of the reliability.

For example, Japanese Patent Application Laid-open No. 2007-272748 (paragraphs [0027] to [0029], FIG. 3) discloses an IC card including a base plate provided with an IC chip on which a reinforcing plate is adhered via a thermosetting adhesive film. The manufacturing method for the IC card includes a step of bonding the reinforcing plate onto an upper surface of the IC chip via the adhesive film and a step of thermally curing the adhesive film by thermo-compression bonding of the reinforcing plate with use of a heating tool.

However, in the method of thermally curing the adhesive film by the thermo-compression bonding, there is a problem in that a residual stress in an adhesive layer is large after the thermal curing. In this case, due to the influence of the residual stress in the adhesive layer, there is a fear that the strength of the IC chip may be decreased, and thus the effect of reinforcing the IC chip by reinforcing plates may be cancelled.

In view of the circumstances as described above, there is a need for a manufacturing method and a manufacturing apparatus for a non-contact communication medium, which are capable of reducing the residual stress in the adhesive layer and ensuring the function of reinforcing the IC chip.

According to an embodiment, there is provided a manufacturing method for a non-contact communication medium. The manufacturing method for a non-contact communication medium includes forming a first structure in a first region on a first surface of a base material including an antenna pattern for non-contact communication formed therein. The first structure includes an IC chip mounted on the first region, a first adhesive formed of a thermosetting resin in an uncured state, which is applied on the IC chip, and a first plate member placed on the first adhesive.

A second structure is formed in a second region, which is opposed to the first region, on a second surface opposed to the first surface of the base material. The second structure includes a second adhesive formed of a thermosetting resin in an uncured state, which is applied on the second region, and a second plate member placed on the second adhesive.

The first region and the second region are sandwiched by a first partition wall capable of partitioning the first region and accommodating the first structure and a second partition wall capable of partitioning the second region and accommodating the second structure.

The first partition wall and the second partition wall are heated, to thereby thermally cure the first adhesive and the second adhesive, respectively.

In the above-mentioned manufacturing method for a non-contact communication medium, the first structure and the second structure are accommodated in the insides of the first partition wall and the second partition wall, to thereby partition the first structure and the second structure from the surroundings, respectively. In this state, the first partition wall and the second partition wall are heated so as to thermally cure the first adhesive and the second adhesive. In the above-mentioned manufacturing method, the first region and the second region of the base material are locally heated, to thereby cure the first adhesive and the second adhesive, and hence the entire base material is not subjected to the high heat. With this, it is possible to suppress a thermal load, which is received by the base material, at the minimum. Further, according to the above-mentioned manufacturing method, as compared to the case of heating the entire base material, it is possible to achieve a reduction of energy and processing time period, which are necessary for the heating. In addition, in comparison with a thermo-compression bonding method, the stress received by the adhesive during the curing process is reduced. Thus, the residual stress in the adhesive layer after the curing is also reduced. With this, a mechanical load with respect to the IC chip due to the residual stress is reduced, and the function of reinforcing the IC chip by the first plate member and the second plate member is ensured.

The manufacturing method for a non-contact communication medium may further include: sandwiching the first region and the second region by the first partition wall and the second partition wall after the first structure is formed; and heating the first partition wall, to thereby cure the first adhesive preliminarily.

The preliminary curing process of the first adhesive is added, and hence it is possible to suppress the first adhesive from generating bubbles, which could be generated upon bumping during the main curing process. Therefore it is possible to stably perform the appropriate thermal curing process.

Similarly, the manufacturing method for a non-contact communication medium may further include: sandwiching the first region and the second region by the first partition wall and the second partition wall after the second structure is formed; and heating the second partition wall, to thereby cure the second adhesive preliminarily.

The preliminary curing process of the second adhesive is added, and hence it is possible to suppress the second adhesive from generating bubbles, which could be generated upon bumping during the main curing process. Therefore it is possible to stably perform the appropriate thermal curing process.

According to another embodiment, there is provided a manufacturing apparatus for a non-contact communication medium. The manufacturing apparatus for a non-contact communication medium includes: a first processing portion; a second processing portion; and a heating portion.

The first processing portion forms a first structure in a first region on a first surface of a base material including an antenna pattern for non-contact communication formed therein. The first structure includes an IC chip mounted on the first region, a first adhesive formed of a thermosetting resin in an uncured state, which is applied on the IC chip, and a first plate member placed on the first adhesive.

The second processing portion forms a second structure in a second region, which is opposed to the first region, on a second surface opposed to the first surface of the base material. The second structure includes a second adhesive formed of a thermosetting resin in an uncured state, which is applied on the second region, and a second plate member placed on the second adhesive.

The heating portion includes a first metal partition wall, a second metal partition wall, a moving mechanism, and a heating source. The first partition wall includes a first annular contact surface capable of being brought into contact with the first surface, and a first recessed portion capable of partitioning the first region and accommodating the first structure. The second partition wall includes a second annular contact surface capable of being brought into contact with the second surface, and a second recessed portion capable of partitioning the second region and accommodating the second structure. The second partition wall is arranged to be opposed to the first partition wall. The moving mechanism is capable of moving the first partition wall and the second partition wall between a first position in which the first partition wall and the second partition wall come closer to each other and a second position in which the first partition wall and the second partition wall are moved away from each other. The heating source is capable of individually heating the first partition wall and the second partition wall.

In the above-mentioned manufacturing apparatus, the first processing portion performs, with respect to the first region of the base material, the mounting of the IC chip, the application of the first adhesive, and the placement of the first plate member in the stated order. In this manner, the first structure is formed. The second processing portion performs, with respect to the second region of the base material, the application of the second adhesive and the placement of the second plate member in the stated order. In this manner, the second structure is formed. In the heating portion, the moving mechanism moves the first partition wall and the second partition wall from the second position to the first position. In this manner, the first region and the second region of the base material are sandwiched between the first partition wall and the second partition wall. As a result, by the first partition wall and the second partition wall, the first region and the second region on the base material is partitioned from the surroundings, and the first structure and the second structure are accommodated in the first recessed portion and the second recessed portion, respectively. The heating source heats the first partition wall and the second partition wall individually, to thereby thermally cure the first adhesive and the second adhesive.

According to the above-mentioned manufacturing apparatus, the first region and the second region of the base material are locally heated, to thereby cure the first adhesive and the second adhesive, and hence the entire base material is not subjected to the high heat. With this, it is possible to suppress a thermal load, which is received by the base material, at the minimum. Further, according to the above-mentioned manufacturing apparatus, as compared to the case of heating the entire base material, it is possible to achieve a reduction of energy and processing time period, which are necessary for the heating. In addition, in comparison with a thermo-compression bonding method, the stress received by the adhesive during the curing process is reduced. Thus, the residual stress in the adhesive layer after the curing is also reduced. With this, a mechanical load with respect to the IC chip due to the residual stress is reduced, and the function of reinforcing the IC chip by the first plate member and the second plate member is ensured.

The first partition wall and the second partition wall may include ceramic coating layers. The ceramic coating layers are respectively formed on inner surfaces of the first recessed portion and the second recessed portion, and radiate far-infrared rays when heated.

With this, it is possible to increase the heating efficiency of the first adhesive and the second adhesive, and hence possible to achieve a promotion of the curing process.

The manufacturing apparatus for a non-contact communication medium may further include a conveying portion including a feeding roller and a wind-up roller. The feeding roller feeds the base material having a band shape, which includes a plurality of antenna patterns printed thereon, toward the first processing portion, the second processing portion, and the heating portion. The wind-up roller winds up the base material having the band shape.

The above-mentioned manufacturing apparatus using the roll-to-roll method is employed, and hence it is possible to achieve an enhancement in the productivity of the non-contact communication medium. As described above, according to the an embodiment, it is possible to thermally bond the plate member without subjecting the entire base material to the high heat. Further, it is possible to reduce the residual stress in the adhesive layer, and hence to ensure the effect of reinforcing the IC chip by the plate members.

Additional features and advantages are described herein, and will be apparent from the following Detailed Description and the figures.

BRIEF DESCRIPTION OF THE FIGURES

FIG. 3 are plan views of main parts of the IC module, in which

FIG. 4A-4F show a schematic procedure of a manufacturing method for the non-contact communication medium according to the first embodiment;

DETAILED DESCRIPTION

Embodiments of the present application will be described below in detail with reference to the drawings.

First Embodiment

Figure 1:
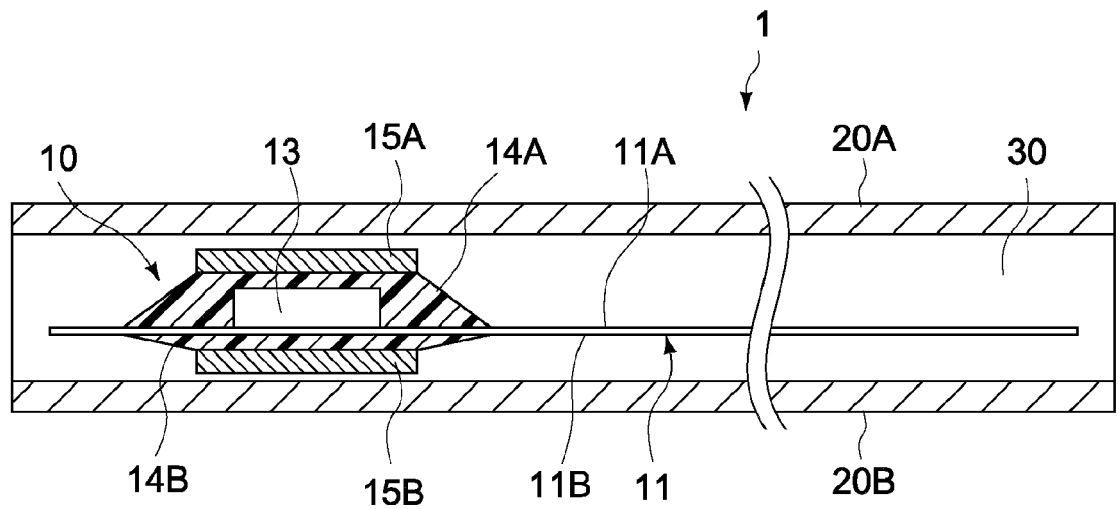
FIG. 1 is a schematic sectional view of a non-contact communication medium according to a first embodiment.

FIG. 1 is a schematic sectional view showing the configuration of a non-contact communication medium according to a first embodiment. In the following, the entire configuration of the non-contact communication medium according to the first embodiment will be described.

Configuration of Non-Contact Communication Medium

A non-contact communication medium 1 is used as a non-contact IC card, a non-contact IC tag, or a non-contact IC token, for example. The non-contact communication medium 1 includes the following: an IC module 10; a pair of outer sheets 20A and 20B; and an adhesive material layer 30 for embedding the IC module 10 between the pair of outer sheets 20A and 20B.

Various plastic sheets are used as the outer sheets 20A and 20B, which may be, for example, formed of a polyimide, a polyester, a polyethylene terephthalate, a polyethylene naphthalate, a propylene, a cellulose acetate, a cellulose diacetate, a acrylonitrile-butadiene-styrene resin, an acrylonitrile-styrene resin, a polystyrene, a polyacrylonitrile, a poly(methyl acrylate), a poly(methyl methacrylate), a poly(ethyl acrylate), a poly(ethyl methacrylate), a vinyl acetate, a polyvinyl alcohol, a polycarbonate, or the mixture thereof. In the first embodiment, polyethylene terephthalate sheets are used.

The adhesive material layer 30 is made of a thermosetting resin, and in the first embodiment, is formed by curing a two component epoxy-based adhesive. The two component epoxy-based adhesive generally refers to an adhesive performing the adhering due to curing reaction itself caused when a compound (main agent) containing an epoxy group and a curing agent containing amines and an acid anhydride are mixed together. The compound containing an epoxy group includes a bisphenol A type, a hydrogen added bisphenol A type, a novolac type, a bisphenol F type, a brominated epoxy resin, a cyclic aliphatic epoxy resin, a glycidyl amine-based resin, a glycidyl ester-based resin, and the like. Meanwhile, the curing agent containing amines and an acid anhydride includes an aliphatic primary/secondary amine (triethylenetetramine, dipropyl triamine, or the like), an aliphatic tertiary amine (triethanolamine, reaction product of aliphatic primary/secondary amine and epoxy, or the like), an aliphatic polyamine (diethylenetriamine, tetraethylenepentamine, bis(hexamethylene)triamine, or the like), an aromatic amine (m-phenylenediamine, diaminodiphenylmethane, diaminodiphenylsulfone, or the like), an amine adduct (reaction product of polyamine and epoxy group, or the like), an aromatic acid anhydride (trimellitic anhydride, pyromellitic anhydride, or the like), a dicyandiamide, the derivative thereof, imidazoles, and the like.

IC Module

Figure 2:
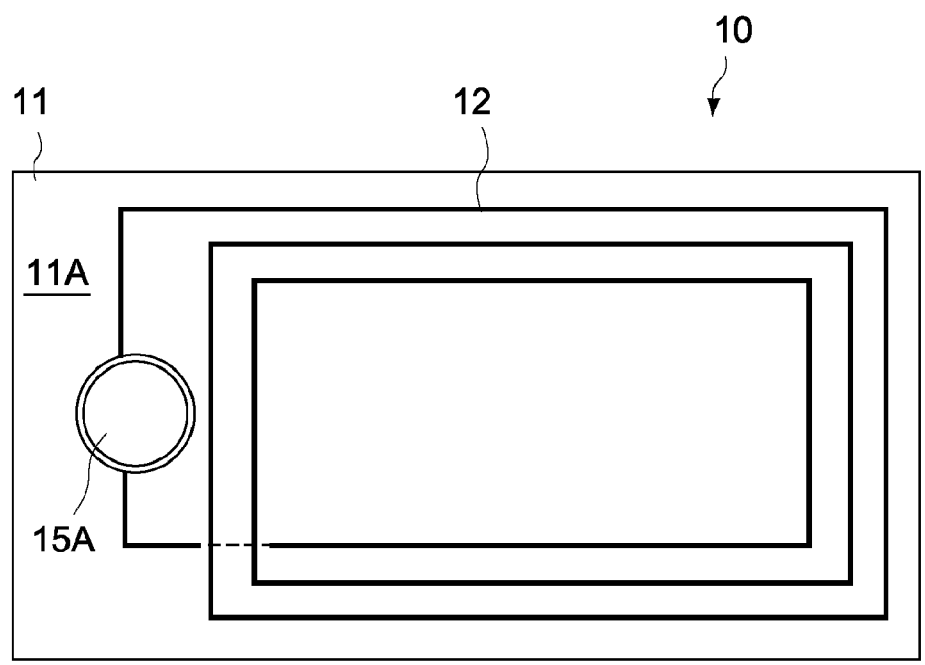
FIG. 2 is a schematic plan view of an IC module constituting the non-contact communication medium.

Next, the configuration of the IC module 10 will be described. FIG. 2 is a schematic plan view of the IC module 10.

The IC module 10 includes the following: an insulating base material 11; an antenna pattern 12 formed in the base material 11; an IC chip 13 electrically connected to the antenna pattern 12; and reinforcing plates 15A and 15B (plate members) for reinforcing the IC chip 13.

The base material 11 can be formed of any of various insulating plastic films. Specifically, as the base material 11, a polyester, a polyethylene terephthalate, a polyethylene naphthalate, a polyimide, a polyethylene, a polypropylene, a polyvinyl chloride, an acrylic resin, a polycarbonate, an epoxy resin, a urea formaldehyde resin, a urethane resin, a melamine resin, or the like can be appropriately selected.

The antenna pattern 12 is wound in a loop form in a surface of the base material 11. The antenna pattern 12 is formed by pattern-etching a laminate substrate formed of the plastic film and a conductive film such as an aluminum film or a copper film. It should be noted that the antenna pattern 12 may be an electrically conductive paste printed on the base material 11.

Figure 3A:
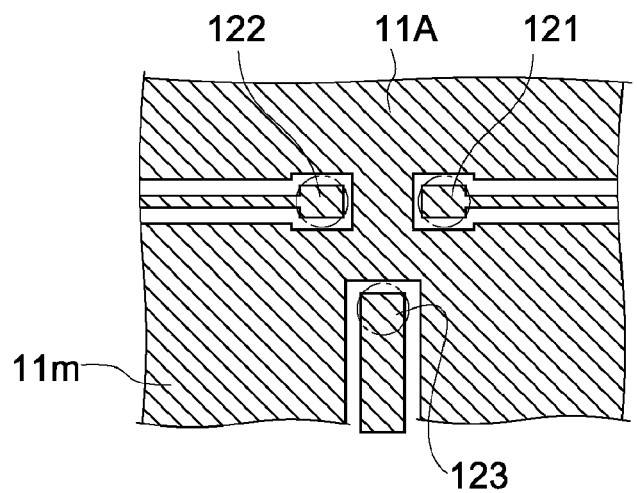
FIG. 3A shows the state before an IC chip is mounted.
Figure 3B:
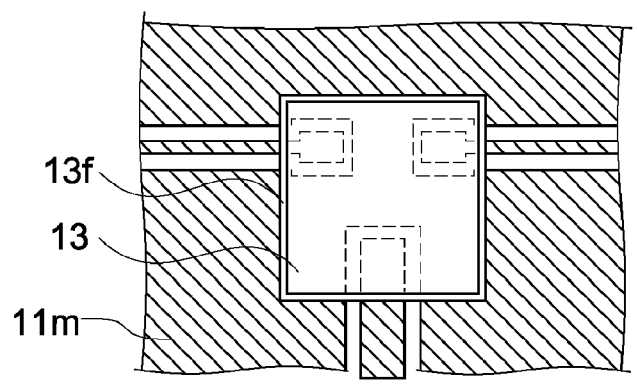
FIG. 3B shows the state after the IC chip is mounted.
Figure 3C:
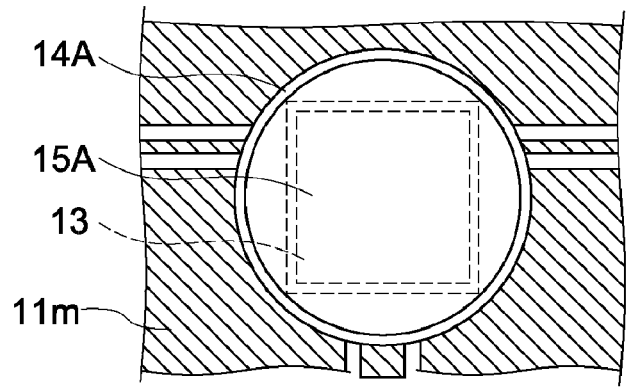
FIG. 3C shows the state after the IC chip is sealed.

FIG. 3 are plan views of a chip-mounting region (first region) formed on a front surface 11A of the base material 11. It should be noted that FIG. 3A shows the state before the IC chip 13 is mounted, FIG. 3B shows the state after the IC chip is mounted, and FIG. 3C shows the state after the reinforcing plate 15A is adhered to the IC chip 13.

As shown in FIG. 3A, the chip-mounting region of the base material 11 is covered with a conductor film 11m laminated on the base material 11. For the sake of easy understanding, in FIGS. 3A to 3C, the conductor film 11m is shown in hatching. Two terminal patterns 121 and 122, which are connected to the antenna pattern 12, and a dummy terminal pattern 123 are each formed by subjecting the conductor film 11m to etching. The dummy pattern 123 is for stably supporting the IC chip 13 at three points with respect to the base material 11. The dummy pattern 123 supports a dummy bump formed to the IC chip 13.

Although not shown, the conductor film 11m also covers a region (second region), which is opposed to the chip-mounting region, of a back surface 11B of the base material 11 in the similar manner. The conductor film 11m functions as a close contact layer for causing sealing adhesives 14A and 14B to adhere to the base material 11 with a high close-contact property. Therefore, in some combinations of the respective materials for the base material 11 and the adhesives 14A and 14B, the covering by the conductor film 11m may be unnecessary.

As shown in FIG. 3B, the IC chip 13 is mounted on the chip-mounting region. In the first embodiment, via an anisotropically-conductive film (ACF) 13f covering the two terminal patterns 121 and 122 and the dummy pattern 123, the IC chip 13 is mounted in a flip chip method. The anisotropically-conductive film 13f is formed of a thermosetting resin material containing electrically conductive particles. The thermosetting resin material is a functional material capable of having an electrical conductivity in a pressing direction. It should be noted that, for example, by soldering, the IC chip 13 can also be mounted.

The reinforcing plates 15A and 15B are formed of stainless metal plates, for example. The reinforcing plates 15A and 15B are caused to adhere via the adhesives 14A and 14B to the front surface of the IC chip 13 and the chip-mounting region on the back surface 11B side of the base material 11, respectively. The area of each of the reinforcing plates 15A and 15B is not particularly limited. However, when each of the reinforcing plates 15A and 15B has an area larger than that of the IC chip 13 as shown in FIG. 1 and FIG. 3C, it is possible to enhance a function of reinforcing the IC chip 13. For example, in a case where the IC chip 13 is in a square form, which has sides each ranging from 2.3 mm to 5.5 mm, it is possible to use, as the reinforcing plates 15A and 15B, circular plate members each having a diameter ranging from 4.5 mm to 8.0 mm.

The planer shape of each of the reinforcing plates 15A and 15B is also not particularly limited, and it is possible to employ, in addition to the circular shape shown in the drawing, a polygonal shape including a rectangular shape or the like. The thickness of each of the reinforcing plates 15A and 15B is also not particularly limited. As the thickness of each of the reinforcing plates 15A and 15B becomes larger, it is possible to further enhance the function of reinforcing the IC chip 13. However, if the thickness is too large, the flatness of the sheet surface of the bonded outer sheets 20A and 20B is easily deteriorated.

The adhesives 14A and 14B are each formed of an insulating thermosetting resin. As the thermosetting resin, there can be used, in addition to a thermosetting resin of a condensed type such as an epoxy resin, a urethane resin, a phenol resin, a hydroxyl group-containing polyester resin, and a hydroxyl group-containing acrylic resin, any resin such as a radical polymerization type resin using a monofunctional vinyl-based monomer and a polyfunctional vinyl-based monomer, or mixture type resin thereof. Further, the thermosetting resin may be a phosphoric acid-containing resin such as a phosphoric acid acrylate. In addition, in order to enhance the strength, a filler such as silica fine particles or glass fibers may be mixed into the thermosetting resin. In the first embodiment, the adhesives 14A and 14B is formed of an epoxy resin.

The IC module 10 is configured as described above. It should be noted that, although not shown, the IC module 10 may include a tuning capacitor unit.

Manufacturing Method for IC Module

Next, a manufacturing method for the IC module 10 configured as described above will be described. FIGS. 4A to 4F show a schematic procedure showing one example of the manufacturing method for the IC module 10.

First, the base material 11 is placed while the front surface 11A is upwardly oriented and the back surface 11B is downwardly oriented. Then, as shown in FIG. 4A, on the chip-mounting region of the front surface 11A of the base material 11, the IC chip 13 is mounted. For mounting the IC chip 13, for example, a typical mounter (not shown) can be used. After that, as shown in FIG. 4B, on the IC chip 13, a predetermined amount of the first adhesive 14A in an uncured state is applied. For applying the adhesive 14A, for example, a typical dispenser nozzle (not shown) can be used. After that, as shown in FIG. 4C, in such a manner that the adhesive 14A is crushed, a reinforcing plate 15A is placed on the IC chip 13. At this time, the adhesive 14A is forced into around the reinforcing plate 15A to surround the IC chip 13. In the above-mentioned manner, on the front surface 11A of the base material 11, there is formed a first structure 100A including the IC chip 13, the adhesive 14A, and the reinforcing plate 15A.

Next, as shown in FIG. 4D, the base material 11 is turned upside down with the result in which the front surface 11A is downwardly oriented and the back surface 11B is upwardly oriented. Then, on the chip-mounting region of the back surface 11B of the base material 11, a predetermined amount of a second adhesive 14B is applied. After that, as shown in FIG. 4E, in such a manner that the adhesive 14B is crushed, a reinforcing plate 15B is placed. In the above-mentioned manner, on the back surface 11B of the base material 11, there is formed a second structure 100B including the adhesive 14B and the reinforcing plate 15B.

Subsequently, as shown in FIG. 4F, in the chip-mounting region on the front surface 11A side of the base material 11, there is provided a first partition wall 40A. At the same time, in the chip-mounting region on the back surface 11B side of the base material 11, there is provided a second partition wall 40B. The first partition wall 40A includes a cavity capable of accommodating the first structure 100A, and the second wall 40B includes a cavity capable of accommodating the second structure 100B. With this, the chip-mounting regions of the base material 11 are partitioned by the partition walls 40A and 40B. In this state, the partition walls 40A and 40B are individually heated to a predetermined temperature (for example, ranging from 100° C. to 250° C.), to thereby individually thermally cure the adhesives 14A and 14B of the structures 100A and 100B.

In the above-mentioned manufacturing method, the chip-mounting regions of the base material 11 are locally heated, to thereby cure the adhesives 14A and 14B, and hence the entire base material 11 is not subjected to the high heat. With this, it is possible to suppress a thermal load, which is received by the base material 11, at the minimum. Further, according to the above-mentioned manufacturing method, as compared to the case of heating the entire base material 11, it is possible to achieve a reduction of energy and processing time period, which are necessary for the heating. In addition, during the curing process, a mechanical stress is seldom applied to the adhesives 14A and 14B, and hence the residual stress in the adhesive layer after the curing is also reduced. With this, a mechanical load to the IC chip 13 due to the residual stress is reduced, and the function of sealing the IC chip through the adhesives 14A and 14B and the function of reinforcing the IC chip 13 by the reinforcing plates 15A and 15B are ensured.

As a resin constituting the adhesives 14A and 14B, an epoxy-based resin can be used, the epoxy-based resin having the degree of curing reaction of 80% or more, the hardness (shore D (HSD)) of 80 or more, and the glass transition temperature (Tg) of 100° C. or more and exhibiting at least one heat generation peak at a temperature of 100° C. or less. With use of the above-mentioned resin, it is possible to realize the thermal curing process for 20 seconds or less, in which the degree of curing reaction of 90% or more is obtained at a temperature ranging from 130° C. to 170° C.

After the IC module 10 is manufactured, the pair of outer sheets 20A and 20B are bonded to each other via the adhesive material layer 30 while sandwiching the IC module 10. After that, the adhesive material layer 30 is subjected to the thermal curing process, and further, is cut to have a predetermined size. In this manner, the non-contact communication medium 1 as shown in FIG. 1 is manufactured.

Manufacturing Apparatus for IC Module

Figure 5:
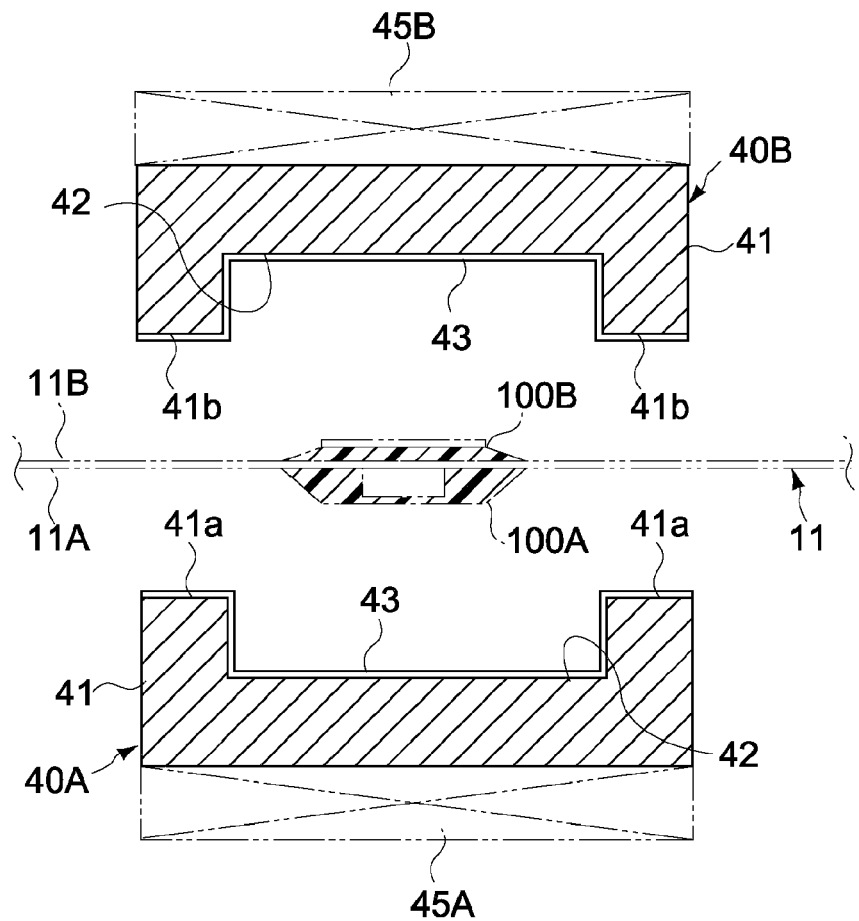
FIG. 5 is a schematic sectional view of main parts of a manufacturing apparatus for the non-contact communication medium according to the first embodiment.

FIG. 5 is a schematic sectional view showing the configuration of the partition walls 40A and 40B. The partition wall 40A includes a main body 41, a recessed portion 42, and an annular contact surface 41a. The main body 41 is formed of a thermally conductive material including a metal material such as stainless steel, copper, or aluminum, or a ceramic material such as an aluminum nitride or a silicon nitride. The recessed portion 42 is formed in the main body 41. The contact surface 41a surrounds the recessed portion 42, and has a flat shape so as to be capable of being brought into contact with the front surface 11A of the base material 11. The recessed portion 42 constitutes a cavity having a volume (height or depth, and width) allowing the first structure 100A to be accommodated therein. The partition wall 40A is provided with a heating source 45A, and hence the partition wall 40A generates the heat due to heating action by the heating source 45A. In this manner, the cavity is heated.

The partition wall 40B has the similar configuration to that of the partition wall 40A. The partition wall 40B includes a main body 41, a recessed portion 42, and a contact surface 41b. The recessed portion 42 constitutes a cavity allowing the second structure 100B to be accommodated therein. The contact surface 41b is capable of being brought into contact with the back surface 11B of the base material 11. The partition wall 40B is provided with a heating surface 45B, and hence the partition wall 40B generates the heat due to heating action by the heating surface 45B. In this manner, the cavity of the recessed portion 42 is heated.

A planer shape of the main body 41 of each of the partition walls 40A and 40B is circular, and each of the recessed portions 42 has a cylindrical shape. With this, it is possible to evenly heat the inside of the recessed portion 42. The shape of each of the main body 41 and the recessed portion 42 is not limited to the above-mentioned example. For example, the recessed portion 42 may be semi-circular. Further, as the volume of the inside of the recessed portion 42 becomes smaller, it is possible to achieve a further enhancement of the heating efficiency.

On an inner surface of the recessed portion 42, there is formed a ceramic-coating layer 43 which radiates a far-infrared ray when heated. With this, it is possible to enhance the heating efficiency of the adhesives 14A and 14B, and hence possible to achieve the promotion of the curing process. The ceramic-coating layer 43 is constituted, for example, by a ceramic material layer including a titanium oxide as a main component.

Figure 6:
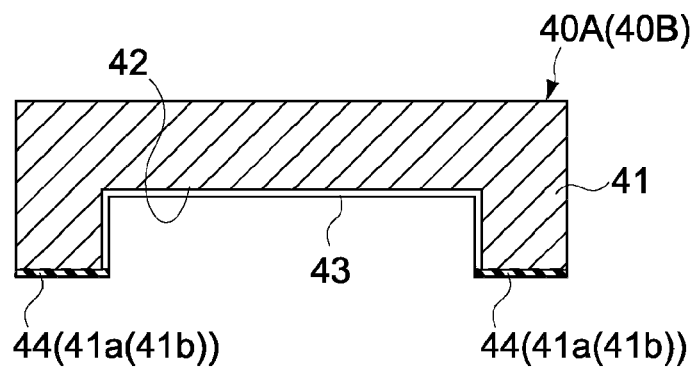
FIG. 6 is a schematic sectional view showing a modified example of the configuration of the manufacturing apparatus.

Meanwhile, FIG. 6 is a schematic sectional view showing another configuration example of the partition walls 40A and 40B. The partition walls 40A and 40B shown in FIG. 6 include elastic sheet members 44. One of the elastic sheet members 44 is attached to a portion constituting the contact surface 41a to be brought into contact with the base material 11. Meanwhile, the other of the elastic sheet members 44 is attached to a portion constituting the contact surface 41b to be brought into contact with the base material 11. The elastic sheet member 44 is formed of a resin material having a thermal resistance or the like, and hence a close contact property between the base material 11 and each of the partition walls 40A and 40B is increased, and a sealing property in the inside of the partition wall is enhanced. Further, due to the action of sandwiching the base material 11 by the partition walls 40A and 40B, there is a fear that an annular pressure mark may be generated to the base material 11 so as to surround the chip-mounting region. The elastic sheet member 44 has an effect of reducing the generation of the above-mentioned pressure mark.

Figure 7:
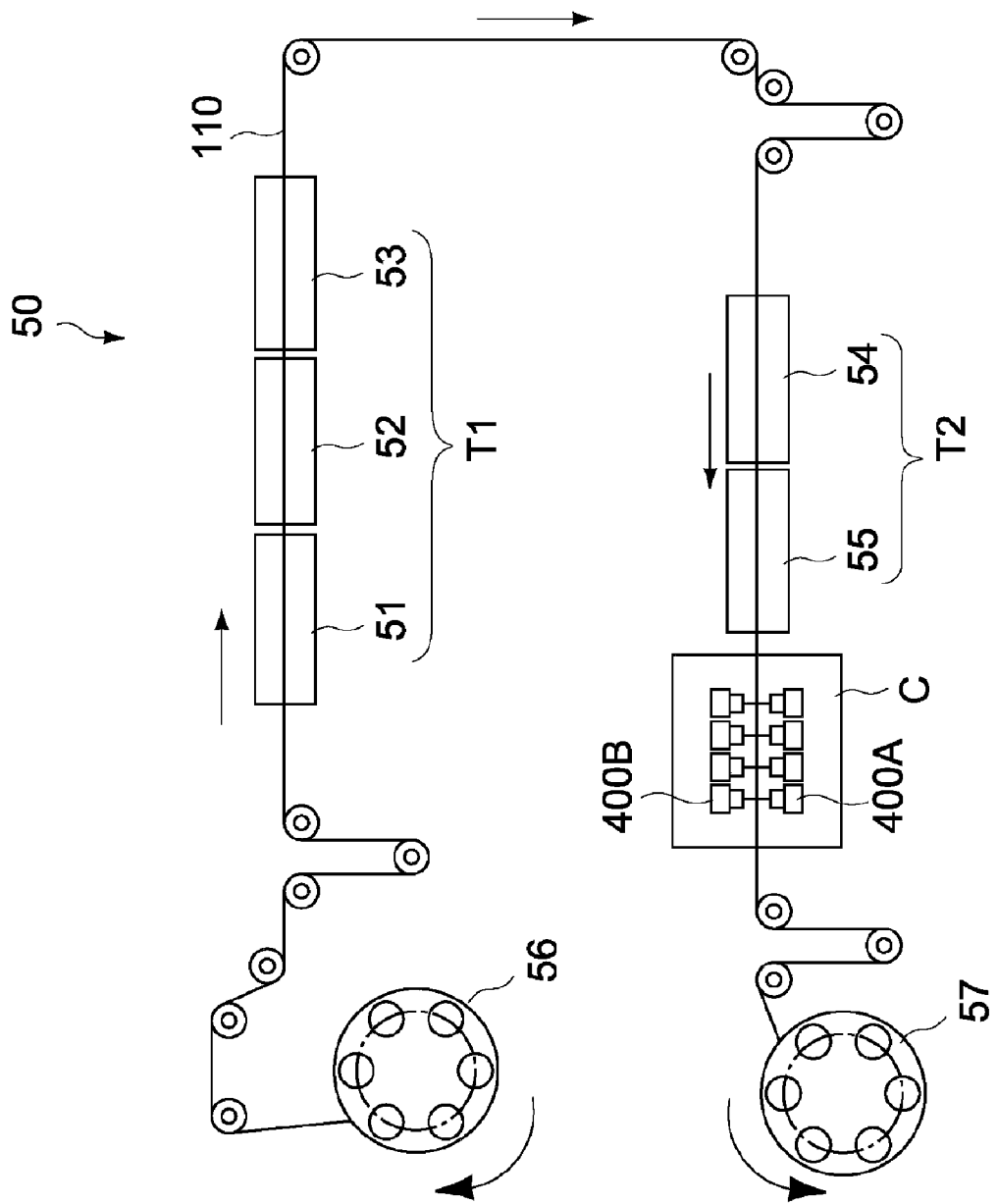
FIG. 7 is a schematic view showing the entire configuration of the manufacturing apparatus.
Figure 8:
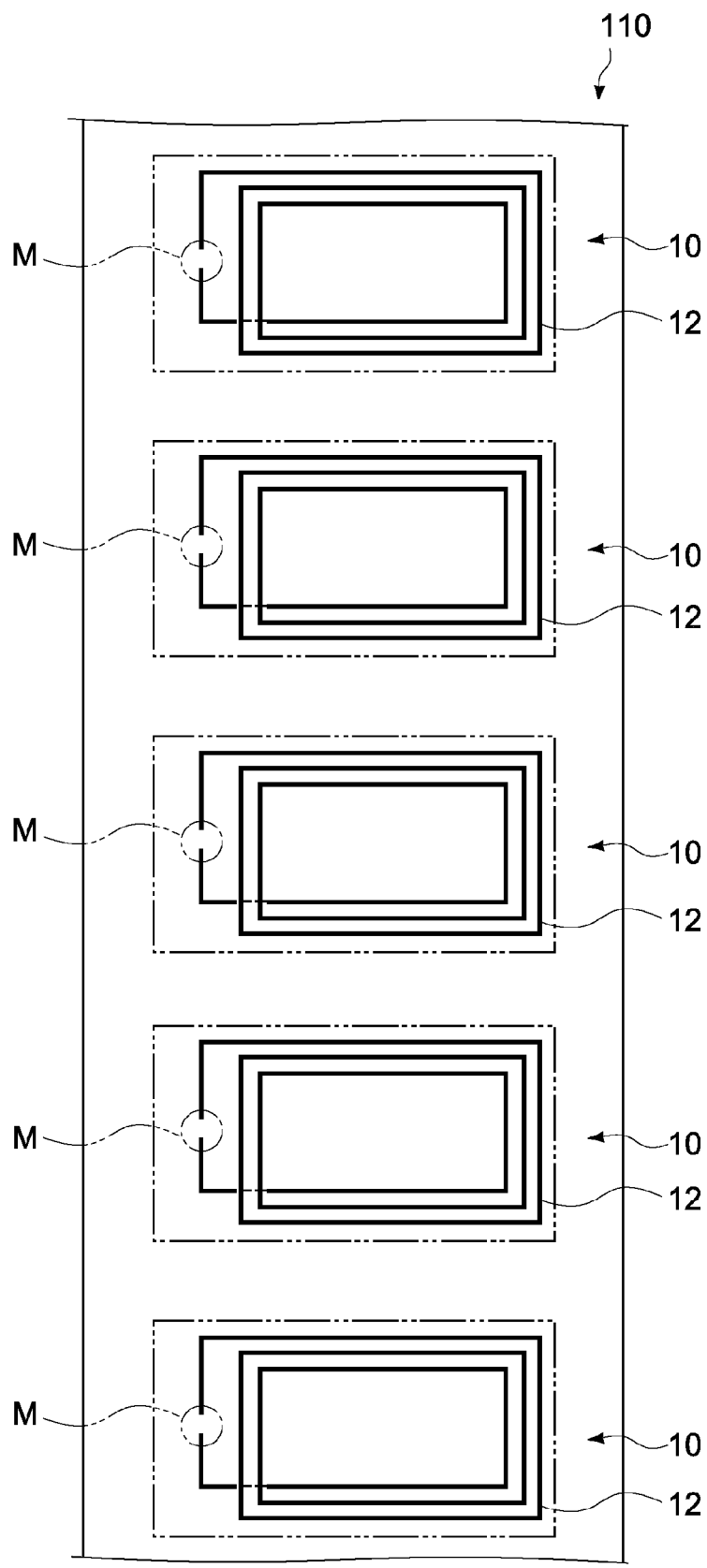
FIG. 8 is a plan view of a base material used for the manufacturing apparatus.

FIG. 7 is a schematic side view of the manufacturing apparatus for the IC module 10. In the manufacturing the IC module 10 with use of a manufacturing apparatus 50 shown in the drawing, a base material 110 having a band shape is used as shown in FIG. 8. In this case, a plurality of antenna patterns 12 are printed on the base material 110. The manufacturing apparatus 50 includes a first processing portion T1, a second processing portion T2, and a heating portion C. In the first processing portion T1 and the second processing portion T2, first structures 100A and second structures 100B are formed on chip-mounting regions M of the front surface and the back surface of the base material 110, respectively. The heating portion C thermally cures the first structures 100A and the second structures 100B. The manufacturing apparatus 50 further includes a feeding roller 56 and a wind-up roller 57. The feeding roller 56 continuously feeds the base material having the band shape. The wind-up roller 57 winds up the base material 110.

The first processing portion T1 includes a first unit 51, a second unit 52, and a third unit 53. The first unit 51 mounts the IC chip 13 on the chip-mounting region M of the front surface of the base material 110. The second unit 52 applies the adhesive 14A on the IC chip 13. The third unit 53 places the reinforcing plate 15A on the adhesive 14A. The first processing portion T1 performs, with respect to the front surface of the base material 110 fed from the feeding roller 56, the mounting of the IC chip 13, the application of the adhesive 14A, and the placement of the reinforcing plate 15A in the stated order. In this manner, each first structure 100A is formed.

The second processing portion T2 includes a fourth unit 54 and a fifth unit 55. The fourth unit 54 applies the adhesive 14B on the chip-mounting region M of the back surface of the base material 110. The fifth unit 55 places the reinforcing plate 15B on the adhesive 14B. The second processing portion T2 performs, with respect to the back surface of the base material 110 turned upside and down, the application of the adhesive 14B and the placement of the reinforcing plate 15B in the stated order. In this manner, each second structure 100B is formed.

The heating portion C heats the structures 100A and 100B through a pair of the partition walls 40A and 40B described with reference to FIG. 5, for example. In this manner, the adhesives 14A and 14B are thermally cured. The heating portion C includes a plurality of sets of upper and lower heating apparatuses 400A and 400B including the partition walls 40A and 40B. The heating portion C thermally processes the structures 100A and 100B formed on a plurality of adjacent antenna patterns 12 at a time.

Figure 9:
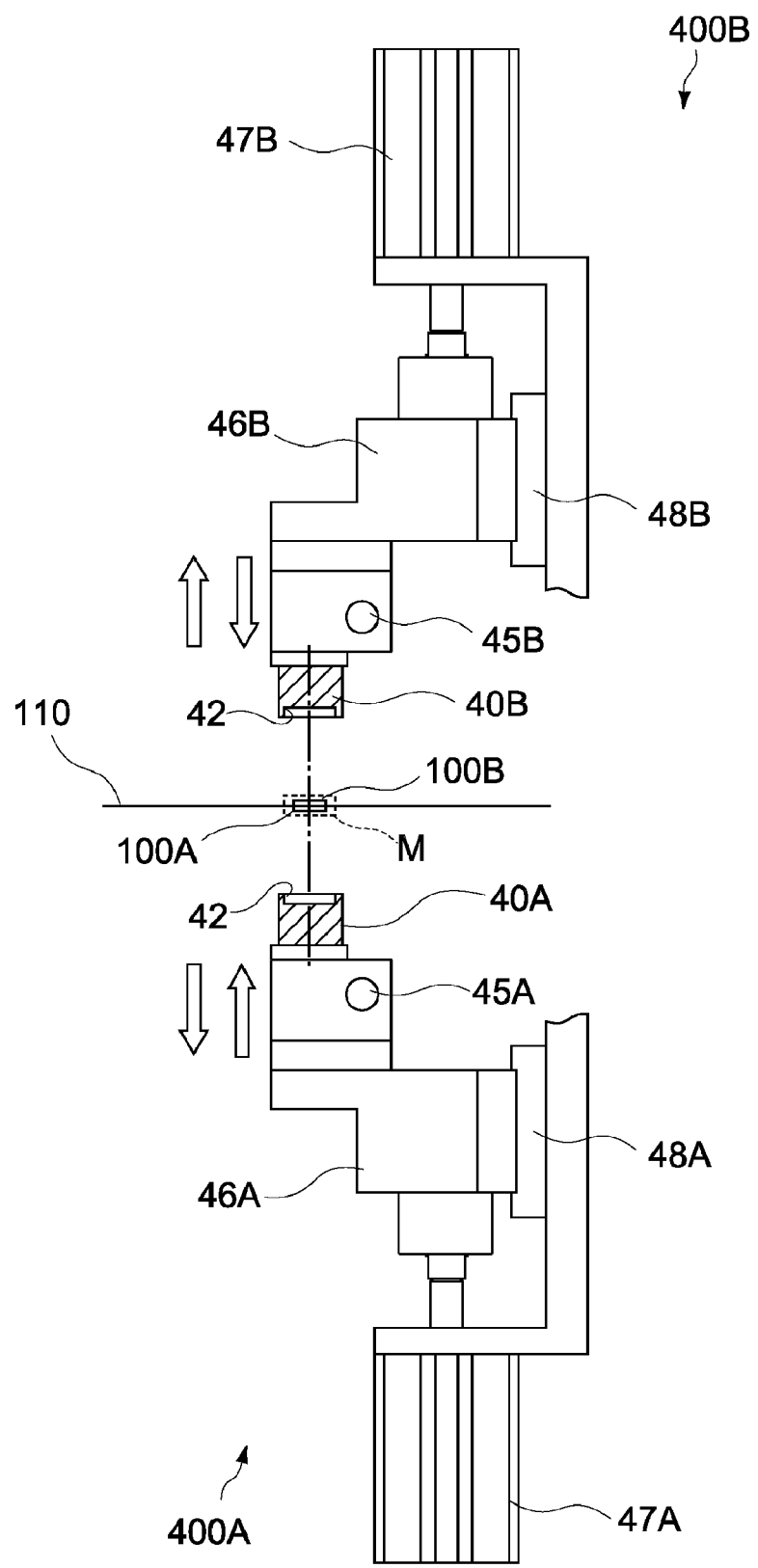
FIG. 9 is a side view of main parts, which shows the apparatus configuration of a heating portion in the manufacturing apparatus.

FIG. 9 is a side view of main parts, which shows the heating apparatuses 400A and 400B. The heating apparatuses 400A and 400B include supports 46A and 46B to support the partition walls 40A and 40B and the heating sources 45A and 45B in such a manner that those members sandwiches the base material 110 in an upper and lower direction, respectively. The supports 46A and 46B are configured to be movable in the upper and lower direction along guide rails 48A and 48B by driving portions 47A and 47B, respectively. The driving portions 47A and 47B include cylinder apparatuses, motors, or the like, and are installed to a mount fixed with static systems.

The supports, the driving portions, and the guide rails constitute a moving mechanism capable of moving the partition walls 40A and 40B between a first position in which the partition walls 40A and 40B come close to each other and a second position in which the partition walls 40A and 40B are moved away from each other. In the first position, the partition walls 40A and 40B sandwich the base material 110 and respectively accommodate the structures 100A and 100B within the recessed portions 42. In this manner, the chip-mounting regions M are partitioned. Then, by the heating sources 45A and 45B, the partition walls 40A and 40B are individually heated to a predetermined temperature for a predetermined time period.

The feeding roller 56 repeats the start and the stop of movement of the base material 110 alternately in a predetermined period, to thereby allow predetermined processes in the first processing portion T1, the second processing portion T2, and the heating portion C to be executed. Although the respective processing portions T1, T2, and C operate in synchronous with each other, the present application is not limited thereto.

After the curing process with respect to the adhesives 14A and 14B is terminated, the base material 110 is wound by the wind-up roller 57 to the arrow direction shown in FIG. 7. After a predetermined length of the base material 110 is wound, the base material 110 is conveyed for a cutting process not shown, and then is cut into an end product size. In the above-mentioned manner, the IC module 10 is manufactured.

According to the first embodiment, in a so-called roll-to-roll method, the IC module 10 is manufactured, and hence it is possible to enhance the production efficiency of the IC modules 10. Further, in each processing portion, each process with respect to a plurality of antenna patterns 12 is performed at a time, and hence it is possible to achieve a further enhancement of the production efficiency of the IC modules 10.

Second Embodiment

Figure 10:
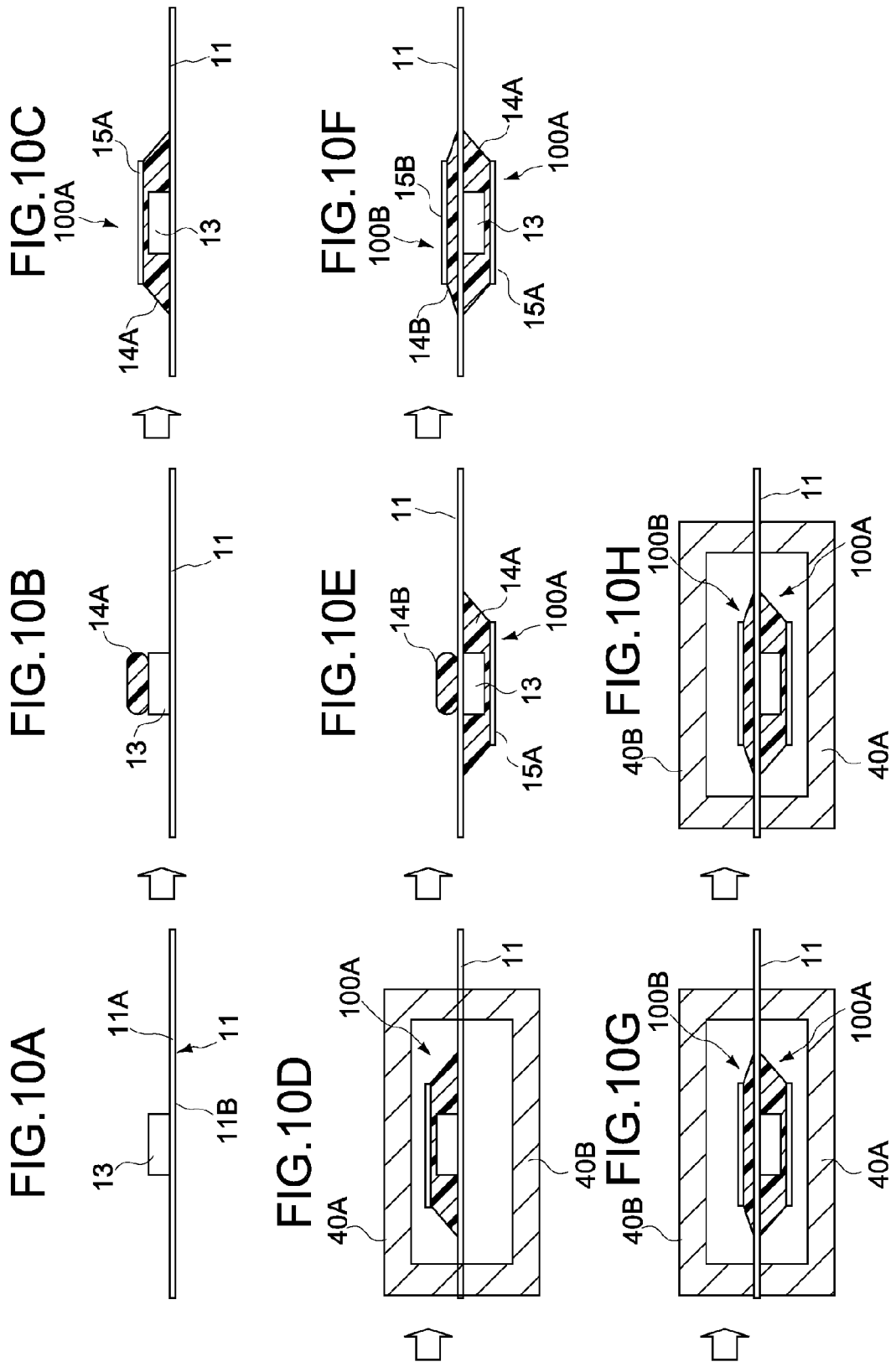
FIG. 10A-10H show a schematic procedure of a manufacturing method for the non-contact communication medium according to a second embodiment.

FIG. 10 show a schematic procedure of a manufacturing method for a non-contact communication medium according to a second embodiment. It should be noted that in FIG. 10, the parts corresponding to those of the first embodiment described above are denoted by the same reference symbols, and the detailed description thereof is omitted.

The manufacturing method for the IC module 10 according to the second embodiment includes a first preliminary heating process to preliminarily cure the adhesive 14A and a second preliminary heating process to preliminarily cure the adhesive 14B.

In the first preliminary heating process, after the first structure 100A is formed on the front surface 11A of the base material 11 as shown in FIGS. 10A to 10D, the base material 11 is sandwiched by the pair of the partition walls 40A and 40B, and the first structure 100A is accommodated within the partition wall 40A. In this state, the partition wall 40A is heated to a predetermined preliminary heating temperature (for example, ranging from 100° C. to 200° C.). As a result, the adhesive 14A is preliminarily cured.

Similarly, in the second preliminary heating process, as shown in FIGS. 10E to 10G, after the second structure 100B is formed on the back surface 11B of the base material 11, the base material 11 is sandwiched by the pair of the partition walls 40A and 40B, and the second structure 100B is accommodated within the partition wall 40B. In this state, the partition wall 40B is heated to a predetermined preliminary heating temperature (for example, ranging from 100° C. to 200° C.). As a result, the adhesive 14B is preliminarily cured. Subsequently, as shown in FIG. 10H, the temperature of each of the partition walls 40A and 40B is raised to a predetermined heating temperature (for example, ranging from 100° C. to 250° C.), to thereby mainly cure the adhesives 14A and 14B.

The degree of the preliminary curing of the adhesives 14A and 14B is not particularly limited, and may be 50%, for example. The processing time period for preliminarily curing the adhesives 14A and 14B is not also particularly limited, and the adhesives 14A and 14B may be appropriately cured depending on the kinds of adhesive.

Also in the second embodiment, it is possible to obtain the same action and effect as that of the above-mentioned first embodiment. In particular, according to the second embodiment, the preliminary curing process with respect to the adhesives 14A and 14B is added, and hence it is possible to suppress the adhesives 14A and 14B from generating bubbles, which could be generated upon bumping during the main curing process. Thus, it is possible to stably perform the curing process with respect to the adhesives 14A and 14B. Further, the preliminary curing process is added, and hence it is possible to suppress rapid curing reaction of the adhesives 14A and 14B. Thus, it is possible to increase the effect of reducing the residual stress.

The inventors of the present application manufactured a plurality of structure samples 1, 2, and 3 in different sealing methods for the IC chip (adhering method for the reinforcing plate 15A), and compared the stress change of the IC chip before and after mounting of the IC chip with respect to each of the samples. In order to measure the stress of the IC chip, a stress-measuring IC "TEG chip (JTEG PHASE5 GB)" manufactured by Hitachi VLSI Systems Co., Ltd. was used, the shape change of a piezo element due to the stress was measured as the change of the resistance, and this value was converted into the stress. Then, the stress change amount before and after the mounting was considered as the degree of the residual stress of the IC chip.

As described in the above-mentioned second embodiment, the sample 1 corresponds to one that is obtained by thermally curing the adhesive 14A through the partition walls 40A and 40B. The sample 2 corresponds to one that is manufactured by thermo-compression-bonding the reinforcing plate to the measuring chip via an adhesive film made of an epoxy resin (see Japanese Patent Application Laid-open No. 2007-272748). The sample 3 corresponds to one that is manufactured through using an ultraviolet curable resin as the adhesive and loading the entire base material into a heating furnace (see Japanese Patent No. 4215886).

Figure 11:
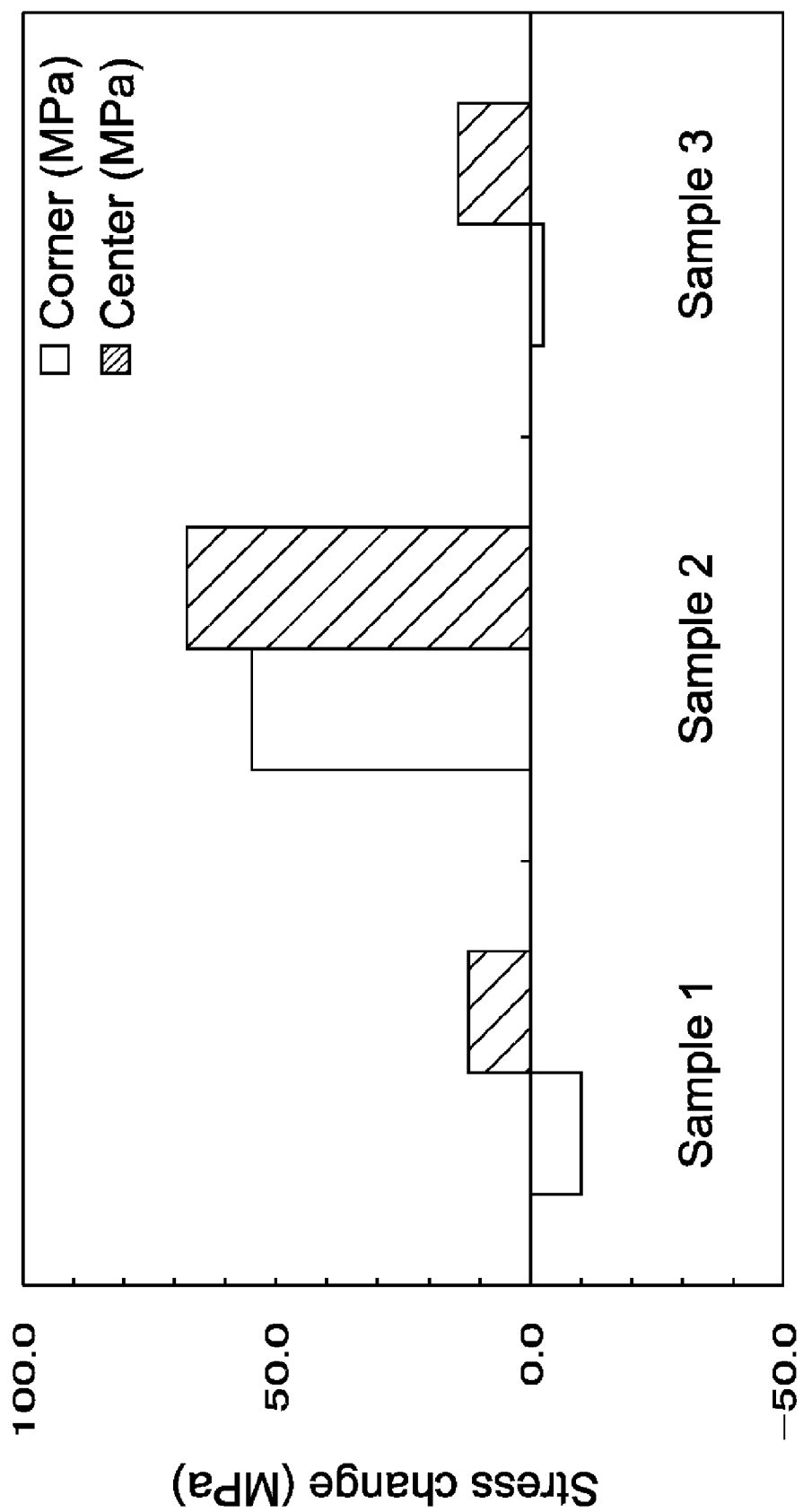
FIG. 11 is a graph showing the result of tests of stress change of IC chips.

The result of the tests is shown in FIG. 11. The stress change amount of each of a center portion and a corner portion of the measuring IC was measured. As shown in FIG. 11, among the samples 1 to 3, the sample 2, which includes the reinforcing plates manufactured in the thermo-compression bonding method, exhibits the largest residual stress. That would be mainly caused by the pressing force acting during the curing of the adhesive film, the contraction due to the curing of the adhesive film, the difference in the thermal expansion between the IC chip and the reinforcing plate, and the like. Meanwhile, regarding the sample 1 and the sample 3, it was confirmed that the residual stress thereof is significantly alleviated as compared with the sample 2.

Although the embodiments have been described in the above, it is needless to say that the present application is not limited to the above-mentioned embodiments, and may be variously modified based on the technical idea of the present application.

Although in the above-mentioned embodiments, the description thereof has been made by exemplifying the non-contact communication medium including the IC module 10 bonded via the adhesive material layer 30 to the outer sheets 20A and 20B, the form in which the IC module is incorporated is not limited to the above-mentioned example.

Further, in the above-mentioned embodiments, the description thereof has been made by exemplifying the manufacturing apparatus for the IC module 10 as the manufacturing apparatus 50 (FIG. 7) for the non-contact communication medium, the step of bonding the outer sheets 20A and 20B may be added thereto. In this case, the wind-up roller 57 may be configured to wind up stacked sheets of the IC module 10 and the outer sheets 20A and 20B.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A manufacturing method for a non-contact communication medium including a base material having a first surface and a second surface opposed to the first surface, the manufacturing method comprising:

forming, in a first region on the first surface, which includes an antenna pattern for non-contact communication formed therein, a first structure including
- an IC chip mounted on the first region,
- a first adhesive formed of a thermosetting resin in an uncured state, which is applied on the IC chip, and
- a first plate member placed on the first adhesive;

forming, in a second region, which is opposed to the first region, on the second surface, a second structure including
- a second adhesive formed of a thermosetting resin in an uncured state, which is applied on the second region, and
- a second plate member placed on the second adhesive;

surrounding the first region with a first partition wall capable of enclosing the first region and accommodating the first structure and surrounding the second region with a second partition wall capable of enclosing the second region and accommodating the second structure; and heating the first partition wall and the second partition wall, to thereby thermally cure the first adhesive and the second adhesive, respectively.

2. The manufacturing method for a non-contact communication medium according to claim 1, further comprising:
surrounding the first region by the first partition wall and the second region by the second partition wall after the first structure is formed; and
heating the first partition wall, to thereby cure the first adhesive preliminarily.

3. The manufacturing method for a non-contact communication medium according to claim 2, further comprising:
surrounding the first region by the first partition wall and the second region by the second partition wall after the second structure is formed; and
heating the second partition wall, to thereby cure the second adhesive preliminarily.

4. The manufacturing method for a non-contact communication medium according to claim 3, wherein a temperature of the heat applied to the first and second partition walls during the preliminary cures is less than a temperature of the heat subsequently applied to the first and second partition walls.

5. The manufacturing method for a non-contact communication medium according to claim 1, wherein the first partition wall and the second partition wall includes a contact surface with an elastic sheet member to contact the respective first and second surfaces.

6. The manufacturing method for a non-contact communication medium according to claim 5, wherein the elastic sheet member reduces a generation of a pressure mark by the first and second partition walls on the first and second surfaces.

7. The manufacturing method for a non-contact communication medium according to claim 1, wherein the first partition wall includes a first recessed portion dimensioned to accommodate the first structure and the second partition wall includes a second recessed portion dimensioned to accommodate the second structure.

8. The manufacturing method for a non-contact communication medium according to claim 7, wherein the first structure is greater in size than the second structure and the first recessed portion is greater in size than the second recessed portion.

* * * * *